(12) United States Patent
Kowles

(10) Patent No.: US 10,228,877 B2
(45) Date of Patent: *Mar. 12, 2019

(54) TRANSIENT COMPRESSION LAYER

(71) Applicant: Seagate Technology LLC, Cupertino, CA (US)

(72) Inventor: Andrew Michael Kowles, Lyons, CO (US)

(73) Assignee: SEAGATE TECHNOLOGY LLC, Cupertino, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/927,674

(22) Filed: Mar. 21, 2018

(65) Prior Publication Data

US 2018/0210671 A1    Jul. 26, 2018

Related U.S. Application Data

(63) Continuation of application No. 15/194,179, filed on Jun. 27, 2016, now Pat. No. 9,952,794.

(51) Int. Cl.
*G06F 12/00* (2006.01)
*G06F 3/06* (2006.01)
*G06F 12/0802* (2016.01)
*G06F 12/0868* (2016.01)

(52) U.S. Cl.
CPC ............ *G06F 3/0638* (2013.01); *G06F 3/061* (2013.01); *G06F 3/0604* (2013.01); *G06F 3/0656* (2013.01); *G06F 3/0673* (2013.01); *G06F 12/0802* (2013.01); *G06F 12/0868* (2013.01); *G06F 2212/1032* (2013.01); *G06F 2212/214* (2013.01)

(58) Field of Classification Search
CPC ..... G06F 3/0638; G06F 3/0604; G06F 3/0673
See application file for complete search history.

(56) References Cited

U.S. PATENT DOCUMENTS

| | | |
|---|---|---|
| 5,247,646 A | 9/1993 | Osterlund et al. |
| 6,115,787 A | 9/2000 | Obara |
| 7,653,847 B1 | 1/2010 | Liikanen et al. |
| 7,752,491 B1 | 7/2010 | Liikanen et al. |
| 2008/0031593 A1 | 2/2008 | Chuang et al. |
| 2008/0288518 A1 | 11/2008 | Matsuo et al. |
| 2011/0019298 A1 | 1/2011 | Duan et al. |
| 2015/0106568 A1 | 4/2015 | Feldman et al. |
| 2015/0131418 A1 | 5/2015 | Huang et al. |
| 2015/0277761 A1 | 10/2015 | Kowles |
| 2016/0350021 A1 | 12/2016 | Matsushita et al. |
| 2017/0090775 A1 | 3/2017 | Kowles |
| 2017/0336981 A1 | 11/2017 | Garcia et al. |

*Primary Examiner* — Prasith Thammavong
(74) *Attorney, Agent, or Firm* — Holzer Patel Drennan

(57) ABSTRACT

A storage device or storage system includes a transient compression layer that is established based on a level of finishedness of the capacity of the storage device or storage system. Data may be compressed and written to the transient compression layer until the capacity is sufficiently finished, after which the compressed data may be destaged and written to the capacity. The transient compression layer may be established on a hard disc media of the storage system or in a SSD of the storage system.

20 Claims, 7 Drawing Sheets

TRANSIENT COMPRESSION LAYER

CROSS-REFERENCE TO RELATED APPLICATIONS

The present application is a continuation of and claims priority to U.S. patent application Ser. No. 15/194,179 (issued as U.S. Pat. No. 9,952,794), filed on 27 Jun. 2016 and titled "Transient Compression Layer," which is hereby incorporated by reference in its entirety.

BACKGROUND

Global demand for data storage devices and services continues to grow and, at times, out paces the global supply. Data storage devices, such as disc drives, solid state drives, and solid state hybrid drives store data to various different recording media, utilizing correspondingly different storage methods. Disc drives are widely used as data storage devices in computing systems. To meet demand, disc drive providers have traditionally increased capacity of disc drives by increasing the areal density of data stored on the disc. At the same time, given the vast amount of data being stored and processed by users as well as the competitiveness of the industry, storage device providers are under pressure to continue driving down the unit cost.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Other features, details, utilities, and advantages of the claimed subject matter will be apparent from the following, more particular written Detailed Description of various implementations as further illustrated in the accompanying drawings and defined in the appended claims.

A method or system comprises determining at least one of a size and location of a transient compression layer based on a measured value of finishedness of a main store of a storage device, receiving a command to write data to the main store, compressing the data, and writing the data to the transient compression layer.

These and various other features and advantages will be apparent from a reading of the following Detailed Description.

BRIEF DESCRIPTIONS OF THE DRAWINGS

DETAILED DESCRIPTION

Figure 1:
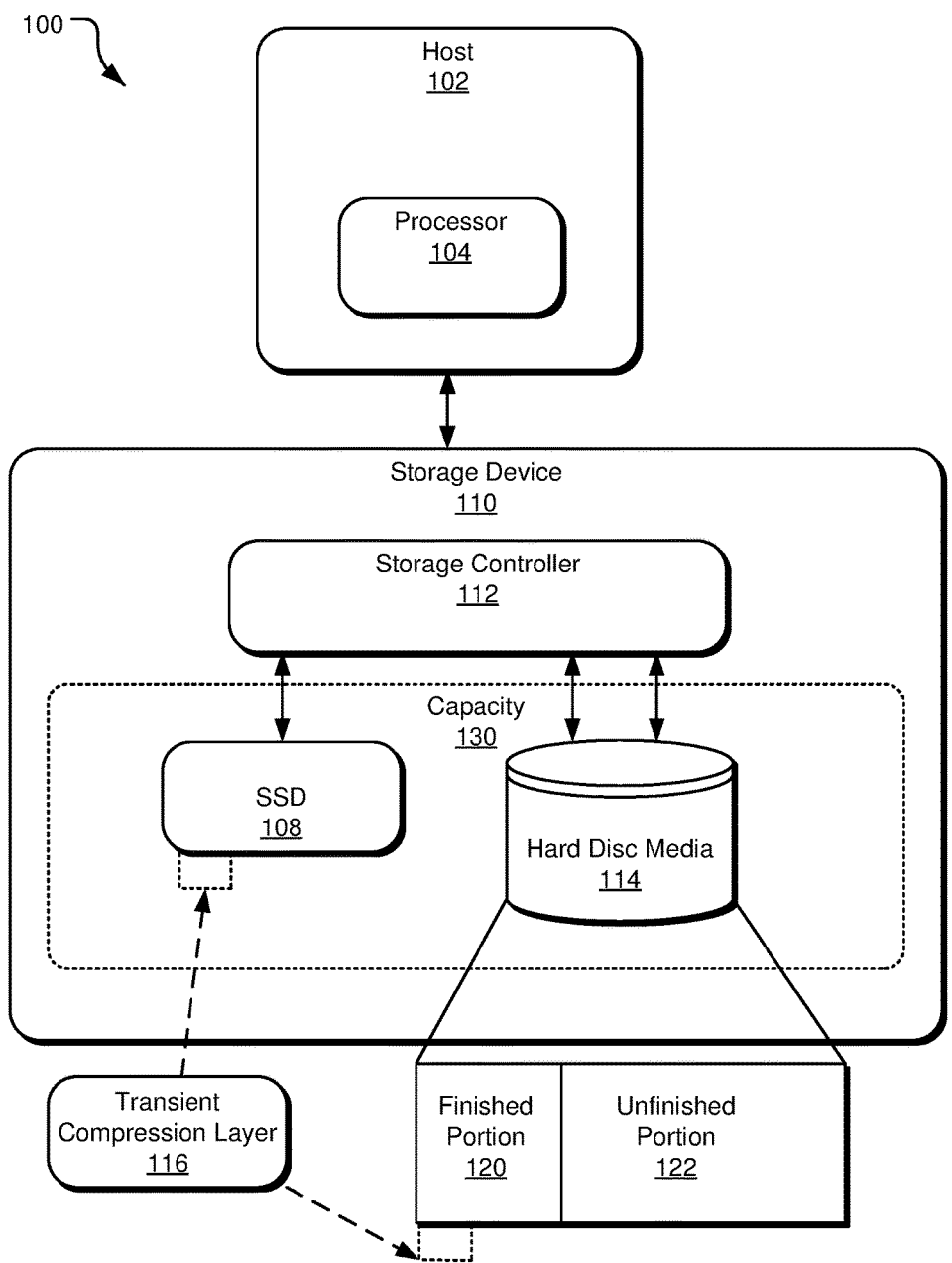
FIG. 1 illustrates a block diagram of an implementation of an example storage system including a transient compression layer.

In the following description, for the purposes of explanation, numerous specific details are set forth in order to provide a thorough understanding of the various implementations described herein. While various features are ascribed to particular implementations, it should be appreciated that the features described with respect to one implementation may be incorporated with other implementations as well. By the same token, however, no single feature or features of any described implementation should be considered essential, as other implementations may omit such features.

As the requirements for data storage, retrieval, and analysis increases, the need for cheaper and faster data storage devices also increases. Disc drives are widely used as data storage devices for computing systems. Such data storage devices, including hard disc drives and solid state hybrid drives, store data on magnetic media, as well as on optical media, solid state storage class memories such as NAND flash, NV DRAM, Resistive RAM (ReRAM), Magnetic RAM (MRAM), Phase Change Memory (PCM), and other advanced and staid memory technologies. To meet demand and lower costs, data storage providers increase the capacity of the storage devices, principally by increasing the density of the data on the magnetic media. In some implementations, adding more heads and discs increases the capacity of the storage devices. In other implementations the form factor size of the storage device may be increased to achieve larger capacity. Substantially, every byte of storage capacity that the storage providers provide to their clients has a production cost attached thereto. For example, such cost may be specified in terms of dollars spent per terabyte produced. For disc drive providers and other storage capacity vendors, it costs more to produce more storage capacity for a constant density. However, given the competitive nature of the storage industry, the price that the storage providers can extract from their clients is limited by market forces. Therefore, the storage providers have incentive to reduce the unit production cost of storage as sold to their clients to increase their profit margin and stay competitive. This is done by increasing density and reducing factory time per unit.

The max production capacity of storage device manufacturers is inelastic and huge capital investments are needed to physically expand via new factories. Therefore, the storage device manufacturers have an incentive to maximize utilization of the existing factory capacity. In other words, storage device manufacturers are acutely interested in generating more storage capacity throughput per unit manufacturing space. One manner in which the storage device manufacturers can generate more storage capacity per unit manufacturing capacity (in terms of space, time, etc.) is to reduce the factory time required to produce unit storage capacity.

After assembly of the storage device, an HDD (or the HDD of a SSHD) (e.g., the main store) may be certified by a self-test process inside the device for a number of storage media physical properties. Such certification may involve multiple iterations of scanning the main store (e.g., HDD) for natural variations, particle contamination, manufacturing defects, gross abnormalities, etc. The certification also determines the ultimate usable capacity of a storage device based on usable zones, media quality, and read/write transducer head capabilities. Such certification often takes a long time (increasing the factory time per TB produced), and of course as the total capacity produced per unit increases, the total certification process becomes commensurately longer per unit. As a result, each drive consumes more factory throughput capacity.

To reduce the factory floor cost per unit or increase factory throughput capacity, storage devices may be shipped to a client with less than the full capacity of an HDD of the device having been fully certified. Shipping the storage media with it being partially certified reduces the per unit factory time by reducing the time spent on certification of a given storage capacity (TB) in the factory. The device may be fully certified after shipment (also known as finish-in-the field). When a storage device is shipped partially certified, the client may absorb the effects of certification. For example, the client may only be able to immediately use the partially certified portion of the HDD for storing data. Furthermore, while the HDD is being certified, the HDD is not accessible to read or write user data. Therefore, the HDD must be certified during down time (e.g., while the HDD is not being written to or read from), or reads and writes must be suspended to certify the HDD.

Implementations disclosed herein provide for enhancing the usability of a given storage device when some portion of the storage media (e.g., the HDD) in the storage device is not yet available to store user data (e.g., not yet certified). In one such implementation, when a storage device is shipped to a customer with less than the full capacity of the main store of the storage device having been fully certified, a transient compression layer is established to store data written by the host to the limited available storage capacity before the main store is substantially finished or certified. The host data may be compressed and stored to the transient compression layer, and thus, the transient compression layer is used as a persistence cache for host write data. A subset of the storage media that is finished (e.g., a finished portion of the main store, HDD, or SSD/DRAM cache) may be designated as the transient compression layer and used to store the compressed data. Such designated area is referred to as the transient compression layer as it is used to store compressed data temporarily only until the necessary amount of finishing process is conducted by the device. The region of the storage media that is used as the transient compression layer may be a region that is finished, based on a ratio of finished/ unfinished, above a predetermined level. For example, a region that is finished above 90% (e.g., 90% of data tracks in the region are finished) may be selected for establishing the transient compression layer. The transient compression layer may be established on one or more of the finished tracks of the region. It should be understood that the terms finished and certified are interchangeable. The storage media may be a single media (e.g., a single disc) or it may be implemented a plurality of discs (e.g., just a bunch of discs (JBOD)) or storage devices.

By using the transient compression layer, the partially finished device may present full functionality and capacity upon arrival at the customer. The transient compression layer may be established as part of the storage media being certified (e.g., the layer may be established in a finished portion of the magnetic media/main store) or it may be established distinct from the storage media (e.g., in NAND, or other volatile or non-volatile media tier).

In some implementations, a portion of the storage media may be reserved for over-provisioning uses, including performance enhancing functions (e.g., a media cache). If a write is directed to the media cache and the size of the data to be written is larger than the capacity of the media cache (e.g., media cache saturation), then the data may be compressed and then written to the media cache. This implementation provides for a larger effective media cache. A saturated media cache may fail to perform its primary function, which is to absorb writes as a persistent write back cache. In order to delay or avoid performance degradation in the case of saturation, data within the media cache is compressed and, as a result, the media cache is enhanced to meet the immediate need, which is to absorb more host data, in compressed form.

A mirrored disc cache application is also considered as an alternative implementation. In such an implementation, the disc cache is configured as a mirrored persistence cache. All incoming data is periodically batched and is then persisted to the mirror. For the purposes of reducing latency, reducing work amplification factor, and increasing the mirror size, all the data going to the mirrored cache is compressed. In such an embodiment, data in the compression layer acting as the mirror will not be destaged. The data is compressed to avoid using more finished media for as long as possible, and to minimize the overhead of using a disc cache, thereby maximizing performance of the storage device or storage system.

FIG. 1 illustrates a block diagram of an implementation of a system 100 with storage media including a transient compression layer. Specifically, FIG. 1 illustrates a storage device 110 having a hard disc media 114 (e.g., spinning magnetic or optical disc) that is not completely finished or certified. The hard disc media 114 may include a main store (e.g., backing store) and a media cache. The system 100 includes a host 102 having a processor 104 that is communicatively connected to the storage device 110. While the system 100 is illustrated to have the storage device 110 external to the host 102, in an alternative implementation, the storage device 110 may be internal to the host 102. The storage device 110 may be, for example, a magnetic disc drive, SSHD, or a SSD. The storage device 110 includes a storage controller 112, the hard disc media 114, a SSD 108 (e.g., a non-volatile cache such as NAND) and a transient compression layer 116. The capacity 130 is what is presented to the host 102, and as such may represent multiple storage media such as the SSD 108 and the hard disc media 114 (or a portion of the hard disc media 114 such as the main store). It should be understood that the capacity 130 may not include portions of storage media of the storage device 110 reserved for other uses. For example, portions of hard disc media 114 may be reserved for over-provisioning uses, which may not be presented to the host 102 as part of the capacity 130. As discussed further below, the transient compression layer 116 may be established in a finished portion of the capacity such as a finished portion of the hard disc media 114 (e.g., a disc) or in a separate storage media of the storage device, such as the SSD 108. It should be understood that the transient compression layer may be established in another storage media such as DRAM or a separate HDD. Further, the transient compression layer 116 may be established in more than one storage media of the storage device 110. As such, the transient compression layer 116 is a virtual construct layered over physical media. The storage device 110 may report an available capacity (e.g., the capacity 130) that includes the hard disc media 114, the SSD 108, and other storage media, even before the HDD is sufficiently finished or certified.

The storage controller 112 is configured to receive commands from the computing device 110 and process the storage commands to read data from the hard disc media 114 and the transient compression layer 116, write data to the hard disc media 114 and transient compression layer 116, control movement of a read/write head (if necessary), etc. The storage controller 112 is also configured to control various data flow and data migration operations, data caching operations, data steering operations, etc. For example, the storage controller 112 steers data between the host 102 and the hard disc media 114, between hard disc media 114 and one or more cache memories (e.g., the transient compression layer 116), and between the host 102 and the one or more cache memories. The storage controller 112 may be, for example, hardware and/or software such as a functional module in firmware of the storage device 110.

The hard disc media 114 may be a spinning magnetic disc that has a finished portion 120 and an unfinished portion 122. The finished portion 120 contains a plurality of sectors or bands of data tracks (not shown) that are usable to store data. The unfinished portion 122 of the hard disc media 114 contains a number of sectors or bands of data tracks (not shown) that have not been certified or finished such that they are not available to store user data. The transient compression layer 116 may be established in a section of the finished portion 120 of the hard disc media 114 or may be established in another storage media. For example, the transient compression layer may be established in the SSD 108 or a separate SSD, HDD, or other volatile or non-volatile memory. The transient compression layer 116 may be used to store data until the storage media is completely finished. The size and location of the transient compression layer 116 may be established based on a level of finishedness of the storage media. A level of finishedness is determined based on the amount of the hard disc media 114 that has been certified or finished. For example, the level of finishedness may be determined based on the number of tracks that are finished. In implementations the level of finishedness may be determined based on a number of finished data tracks in a region or portion of the hard disc media 114.

For example, the storage controller 112 may receive, from the host 102, a request to write data. In response to the request the storage controller 112 may determine the level of finishedness of various regions or portions in the hard disc media 114 that compose the reported capacity. For example, the storage controller 112 may determine that a portion 120 is a finished portion and the remainder of the hard disc media 114 is unfinished portion 122. Note that while in the illustrated implementation, the finished portion 120 and the unfinished portion 122 are contiguous, in alternative implementation the finished portion 120 may include a number of finished regions located throughout the hard disc media 114.

The storage controller 112 may then compress the data and write the compressed data to the transient compression layer 116. The storage controller 112 may then command the certification or finishing process to continue, until another write command is received by the storage controller 112. As the certification process continues, additional space becomes usable. Thus, the transient compression layer 116 may be expanded and additional compressed data may be written to the transient compression layer 116. The process may continue as compressed data is written to the transient compression layer 116 and the hard disc media 114 is finished (e.g., during a down time). In some implementations, data may be steered to the finished portions (e.g., finished portion 120) of the main store based on compression savings due to the transient compression layer 116. For example, if write data may fit in the finished portion 120 of the hard disc media 114 (e.g., outside the transient compression layer), then the data may be steered to hard disc media 114 and written uncompressed instead of compressed and into the transient compression layer. These decisions may be based on the size of the write data, the amount of data available in the transient compression layer 116, the amount of finished space in the hard disc media 114 etc.

Once the hard disc media 114 is finished or certified, the storage controller 112 may unpack and/or destage the data stored in the transient compression layer 116 and write it to the hard disc media 114 using a normal capacity model. See the FIGS. 2, 5, and 6 and their corresponding descriptions for explanations of the destaging process.

The transient compression layer 116 is managed by the storage controller 112, such that read and write operations of the transient compression layer 116 are initiated by the storage device 110 rather than a host computing device (e.g., the host 102). Although the host computing device cannot read or write to the transient compression layer 116, the host computing device can initiate read and write operations to the transient compression layer 116 by sending a request to the storage controller 112 to write data to the capacity 130. The storage controller 112 implements all read and write operations of the storage device 110, including both host-initiated and drive-initiated operations. Accordingly, the storage controller 112 has the ability to filter, redirect, or otherwise alter host-initiated read and write requests without knowledge of the host-computing device. Because the storage controller 112 controls reads/writes to the capacity 130 of the storage device 110 including the transient compression layer 116, the storage controller 112 can report the full capacity 130 to the host 102 before the hard disc media 114 is finished.

The storage controller 112 may present the addressable space of the capacity 130 to the host 102. When writing user data to the storage device 110, the host computer may use the addressing system presented by the storage controller 112 to write data. The storage controller tracks locations in the capacity 130 using the presented addressing system. The controller-level addressing scheme may divide the usable space (e.g., the capacity 130) to establish the transient compression layer 116. As such the transient compression layer 116 may be established on the finished portion 120 of the hard disc media 114 or the SSD 108 (e.g., NAND flash). In this example implementation, the host computer may direct data to a particular address of the presented capacity 130, and the storage controller 112 may compress and redirect the data to a particular portion of the transient compression layer 116. The storage controller 112 then manages mapping of data on the transient compression layer for use for later read requests from the host computer or for destaging of the transient compression layer 116. As such, the storage device 110 presents a transparent capacity to the host 102. In implementations wherein the transient compression layer 116 is established in the SSD 108 (e.g., NAND flash), the finishing process on the hard disc media 114 may not be interrupted.

In one implementation, the information about the level of finishedness of the different sections of the various storage media may be stored in a certification table (also referred to as media certification state table, media latency predictability table, media reliability table, etc.), which may also be stored on the hard disc media 114 (e.g., the main store) or elsewhere in the storage device 110. Such a certification table may be stored on the sections of the storage media that are certified at a very high level of predictability/reliability. The certification table is managed such that the certification level of various sections of the hard disc media 114 is updated in a dynamic manner during operation of the storage device 110. Furthermore, the information stored in the certification table may also be copied locally to the storage controller 112 for fast access. The storage controller 112 may establish or modify the transient compression layer 116 based on data present in the certification table. The size, layout, and location information of the transient compression layer 116 may be stored as a part of the certification table or may be stored elsewhere in the storage device 110.

In one implementation, the storage controller 112 may be configured to dynamically change a compression algorithm or method depending on a number of factors including, but not limited to, size and type of data, available space in the storage media, finishedness of the storage media, or latency. For example, the storage controller 112 may sniff or sample the data to test the data's compression ratio to determine the best compression algorithm. The data may then be compressed using that determined algorithm and written to the transient compression layer 116.

In one implementation, the transient compression layer 116 may act as a media cache, which may be used for over provisioning uses (e.g., not part of the capacity 130), including performance enhancing functions. If the media cache is saturated (e.g., a write is directed to the media cache, but the media cache is approaching a resource limit), then data directed to the media cache and the data within the media cache may be compressed and rewritten. Thus, the media cache is extended in size and more host data is absorbed. In some embodiments, all data written to the media cache may be compressed, thus preemptively extending the size of the media cache. In these and other embodiments, the media cache may be established in a part of the transient compression layer 116, in another section of the finished portion 122 of the hard disc media 114 or in another storage media of the storage device (e.g., NAND, MRAM, SSD).

In another implementation, the transient compression layer 116 may act as a mirror cache. In such an implementation, the transient compression layer 116 is configured as a mirrored persistence cache. All incoming data may be periodically batched and persisted to the mirror. For purposes of reducing latency and work amplification factor and increasing the mirror size, all data going to the mirror cache is compressed. Thus the data written to the hard disc media 114 may be persisted in the mirror in a compressed form. In this implementation, the mirror cache may not be destaged (e.g., decompressed and rewritten to the hard disc media 114) because the data is already in the hard disc media 114.

The implementations described above can be used to realize capacity in a storage media when a portion of the media is not finished/certified. The transient compression layer may be used to store compressed data while the portion of the hard disc media 114 is being finished. As such, the transient compression layer provides a transparent capacity model. The described implementations can further be used to reduce a factory throughput time in manufacturing storage systems. These implementations are described further with respect to the following figures.

Figure 2:
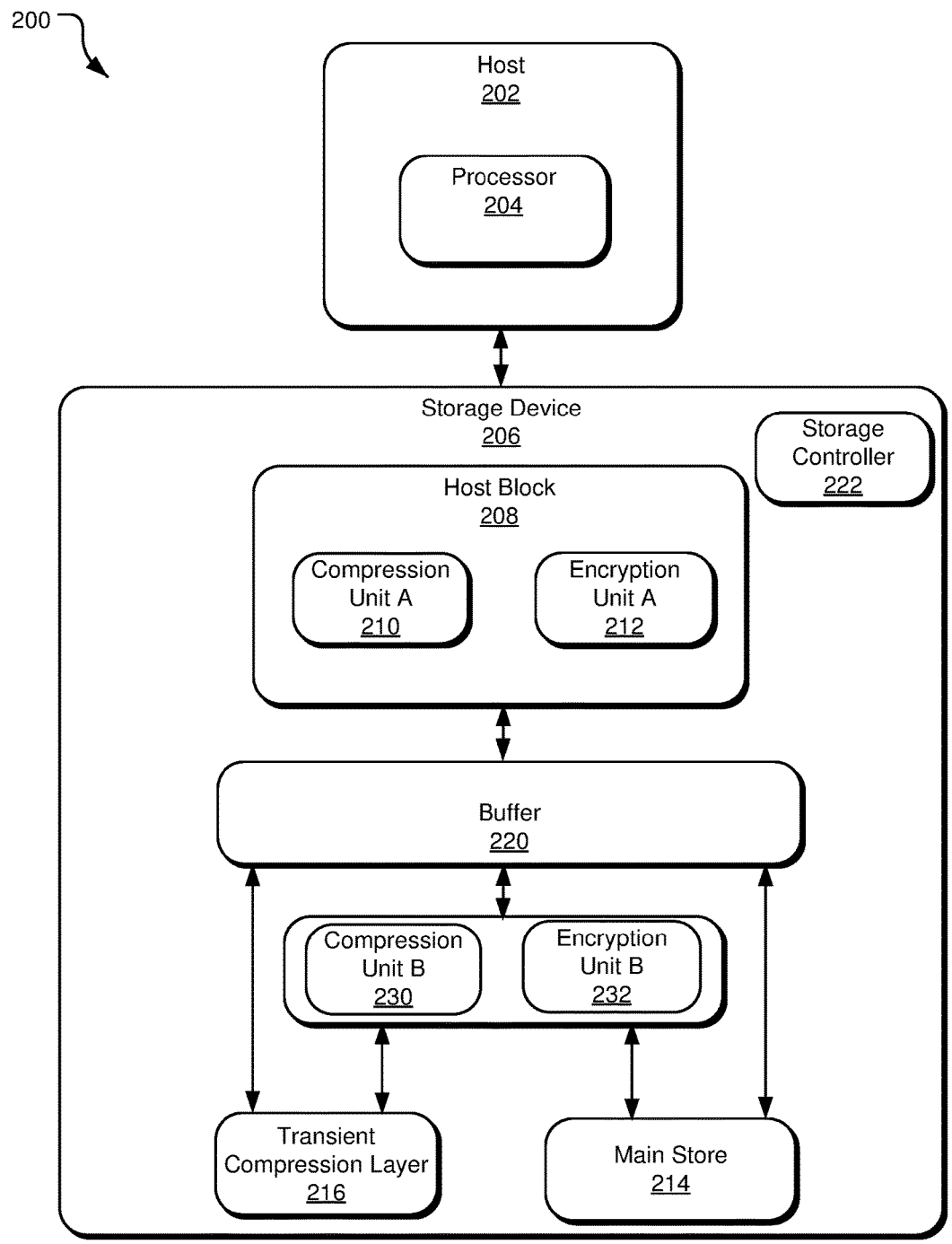
FIG. 2 illustrates another block diagram of an implementation of another example storage system including a transient compression layer.

FIG. 2 illustrates another block diagram of front end interface topology of a storage system 200 including a transient compression layer 216. Specifically, the system 200 includes a computing device 202 having a processor 204 and a storage device 206. While the system 200 is illustrated to have the storage device 206 external to the computing device 202, in an alternative implementation, the storage device 206 may be internal to the computing device 202. The storage device 206 may be, for example, a HDD/magnetic disc drive, an SSHD, etc. The storage device 206 includes a storage controller 222, a host block 208, a buffer 220, a main store 214 (e.g., a backing store), and a transient compression layer 216. It should be understood that the main store 214 and/or the transient compression layer 216 may comprise a portion of a hard disc media of the storage device 206. It should also be understood that the storage device may contain other storage media such as a SSD (e.g., NAND flash memory), and the transient compression layer 216 may be established in the SSD.

The storage controller 222 is configured to receive storage commands from the computing device 202 and process the storage commands to read data from the main store 214 and the transient compression layer 216, write data to the main store 214 and transient compression layer 216, control movement of a read/write head (if necessary), etc. The storage controller 222 is also configured to control various data flow and data migration operations, data caching operations, data steering operations, etc. For example, the storage controller 222 steers data between the host computing device 202 and the main store 214, between the main store 214 and one or more cache memories (e.g., the transient compression layer 216), between the computing device 202 and one or more cache memories (e.g., the transient compression layer 216). Furthermore, the storage controller 222 generates and stores the mapping of storage regions to logical block addresses (LBAs). Specifically, the usable storage regions of the main store 214 are mapped to the LBA space. The storage controller 222 may be, for example, hardware and/or software such as a functional module in firmware of the storage device 206.

The host block 208 includes a compression unit 210 and an encryption unit 212. The host block 208 is a high speed hardware datapath present in the electronics topology of the storage device 206. Such a topology is designed to perform compression and encryption operations on data at very high speeds, while preserving the data reliability with parity. The compression unit A 210 and the encryption unit A 212 may be integrated, co-dependent modules or operate independently of one another. Both the compression unit A 210 and the encryption unit A 212 may be, for example, hardware and/or software such as functional modules in firmware of the storage device 206. The compression unit A 210 is configured to compress data moving to or from the host 202.

The storage device 206 may also include a compression unit B 230 and encryption unit B 232, which may handle compression/encryption operations between the transient compression layer 216 and the main store 214 or between the buffer 220 and the various non-volatile media. For example, the compression unit B 230 may be configured to decompress data coming from the transient compression layer 216 to be stored in the main store 214. Similarly, the encryption unit B 232 may be configured to encrypt data before storage in the transient compression layer 216 or the main store 214. The encryption unit B 232 may also be used to decrypt data transferring from transient compression layer 216 or the main store 214.

The buffer 220 is used to store data awaiting transfer to the main store 214 or transient compression layer 216 from the computing device 202. The buffer may also be used to store data awaiting transfer from the transient compression layer 216 to the main store 214, and from the main store 214 or the transient compression layer 216 to the computing device 202.

The transient compression layer 216 is a persistent write-back cache used for incoming host data while the main store 214 is being certified/finished. The transient compression layer 216 may be implemented in a finished section of the main store 214 or may be implemented in a separate storage medium on the storage device, such as in NV-backed DRAM, NAND (in the case of SSHD), or NOR Flash. In a storage system, the transient compression layer 216 may be established as a separate NV-backed system memory, or on a separate device or devices such as SSDs or HDDs. The concept of a transient compression layer is the same in both the micro or macro viewpoints. The transient compression layer 116 may be used to store data until a majority of the main store 214 is finished. The size and location of the transient compression layer 216 may be established based on a level of finishedness of the main store 214. A level of finishedness is determined based on the amount of the main store 214 that has been certified or finished such as a percentage of the capacity (or a percentage of a sector or region of tracks) that is finished. For example, a track may be finished or unfinished, and the transient compression layer may be established on a plurality of finished tracks.

For example, the storage device 206 may receive, from the computing device 202, a request to write data. The storage controller 222 may determine a level of finishedness of the main store 214 and determine a size and location of the transient compression layer 216 based on the determined level of finishedness of the main store 214. In the same or an alternative implementation, the storage controller 222 uses a previously determined (e.g., based on a previous data write) level of finishedness to establish the size and location of the transient compression layer 216. The data may then be compressed by the compression unit 210, optionally encrypted by the encryption unit 212, and sent to the buffer 220. The buffer 220 may hold the data until the transient compression layer 216 is prepared to receive the compressed and encrypted data. The transient compression layer 216 may be prepared to receive the compressed and encrypted data when a finishing process is suspended. The compressed and encrypted data may then be written to the transient compression layer 216. In such a case, the storage controller 222 and the computing device 202 receive a notification that the data has been written. The storage controller 222 may then direct the finishing process to resume. The finishing process may continue until the main store 214 is completely finished or the computing device 202 requests another write or read. The finishing process is assumed to be interruptible for the purposes of the described embodiments. When the main store is completely finished or when a sufficient level of finishedness is reached, a destaging process may be launched by the storage controller 222 for the purposes of migrating data out of the transient cache and to the main store, and the compressed data may be written to the main store 214 in either compressed or uncompressed format, using either a normal/transparent capacity model or with a variable capacity model, or with a thin provisioned capacity.

In some embodiments, the finishing processes is not suspended before the compressed data is written to the transient compression layer 216. For example, in an embodiment having a SSHD with a NAND transient compression layer 216, the disc finishing process will not be suspended.

The compression unit 210 may be configured to compress the data according to the particular implementation of the storage device 206. For example, if the storage device 206 is implemented in a personal computer capacity, then a first compression method may be used. On the other hand, if the storage device 206 is implemented in a commercial manner, then a second compression may be used. In alternative implementations, the compression unit 210 may be configured to dynamically change compression methods depending on available storage area, the size and type of data, available space in the main store 214 or transient compression layer 216, finishedness of the main store 214, and/or latency requirements. Example lossless compression methods include dictionary type (Lempel-Ziv), simple symbol encoding (Run Length Encoding, Huffman Encoding), iterative compression (LZ-Markov), context compression, or any one of a plentiful number of lossless algorithms which can be optimum depending on the mathematical characteristics of the source data.

Once the main store 214 (e.g., the hard disc media) is completely or sufficiently finished or certified, a destaging process may be initiated. In one implementation, the compressed an encrypted data may be decrypted by the encryption unit 212 then decompressed by the compression unit 210. The decompressed data may then be optionally encrypted by the encryption unit 212 before being written to the certified main store 214 via the buffer 220. Because the data is now decompressed, an improvement in latency in data reads may be realized.

Compressing the data before transferring the data to the buffer 220 and eventually to the transient compression layer 216 can reduce the effective bandwidth on a communications channel between the host block 208 and the buffer 220. Furthermore, a reduction of effective bandwidth on the communications channel between the buffer 220 and the transient compression layer 216 may be realized. Once the data is written to the transient compression layer 216, the storage device 206 may return a status to the computing device 202, the status signifying that the data has been written. Because the data is compressed and effective bandwidth has been reduced on some communications channels, a reduction in time to return status to the computing device may be realized. All of these latency gains may increase performance capabilities of the storage device 206.

Figure 3:
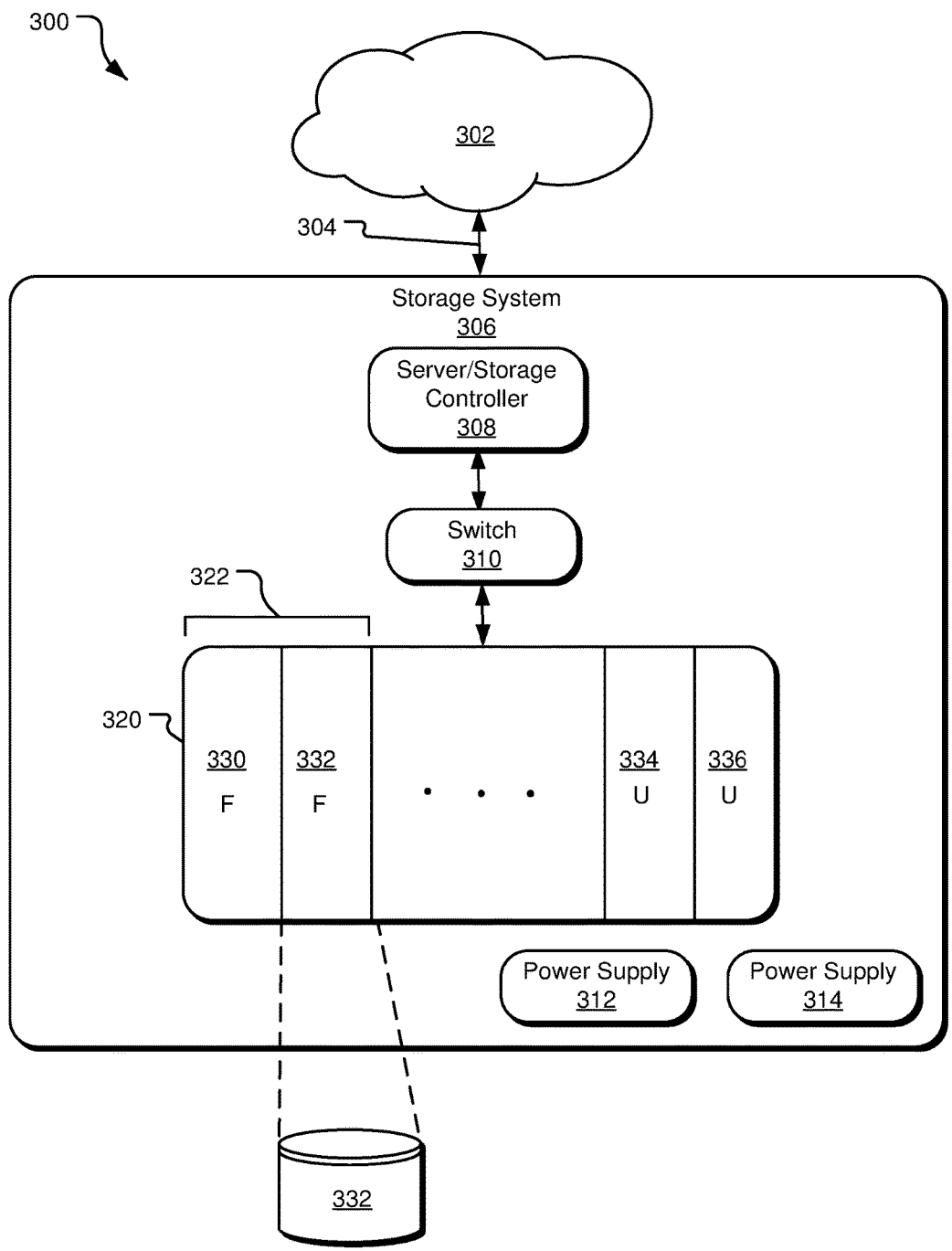
FIG. 3 illustrates another block diagram of an implementation of yet another example storage system including a transient compression layer.

FIG. 3 illustrates another block diagram of an implementation of a system 300 with storage system 306 including a transient compression layer. Specifically, FIG. 3 illustrates an implementation of a transient compression layer 322 implemented in a network application such as a mass storage system (e.g., server cluster or farm) that may include a number of storage racks (not shown) of disc drives. The system 300 includes a network 302, a communication channel 304, and a network storage system 306. The network 302 may be, for example, the Internet, a wide area network (WAN), a local area network, or any other network system as is commonly known or may be developed.

The storage system 306 includes a server/storage controller 308, a switch 310, power supplies 312 and 314, and a plurality of disc drives 320. The storage system 306 may also include one or more encryption units and compression units (not shown). The plurality of disc drives 320 may represent one or more racks of storage devices distributed within a mass storage facility or between a number of mass storage facilities. One or more racks of plurality of disc drives 320 may be interconnected to one another via the computer network 302. Furthermore, the system 300 may be a node of a distributed storage system. The server/storage controller 308 is configured control reads/writes of data to and from the plurality of disc drives 320. For example, the server/storage controller 308 may receive data from the network 302 and direct the received data to a particular disc (e.g., a disc 330) of the plurality of disc drives 320. Alternatively, the server/storage controller 308 may receive a request for particular data, and the server/storage controller will fetch the data from the plurality of disc drives 320 to be sent to the network 302. The server/storage controller 308 is also configured to control various data flow and data migration operations, data caching operations, data steering operations, etc. Furthermore, the server/storage controller 308 generates and stores the mapping of storage regions to logical block addresses (LBAs). Specifically, the usable storage regions of the plurality of disc drives 320 are mapped to the LBA space. The server/storage controller 308 may be, for example, hardware and/or software such as a functional module in firmware of the network storage system 306. The plurality of disc drives 320 may be handled independently or may be combined into a single logical volume by the server/storage controller 308. It should be understood that there may be more than one storage controller 308 on the storage system 306. Furthermore, the plurality of disc drives 320 may represent the reported capacity of the storage system 306.

The switch 310 provides a connection between the server/storage controller 308 and the plurality of disc drives 320. The switch 310 is configured to selectively communicate data between individual discs (e.g., a disc 330) of the plurality of disc drives 320 and the server/storage controller 308 of the storage system 306 and eventually to and from the network 302. In implementations the switch 310 may be a host bus adapter, expander, port multiplier, or a combination thereof.

The power supplies 312 and 314 provide electrical power for components of the storage system 306 such as for operating spinning of all the discs (e.g., disc 330) of the plurality of disc drives 320. Redundancy is provided that each power supply 312 and 314 is rated to supply power for the entire storage system, should one of the power supplies be temporarily taken offline.

The network storage system 306 may be delivered to a client from a manufacturer with the plurality of disc drives 320 not being completely certified. For example, the storage system be delivered with ten discs that are completely certified, 20 discs that are 50% certified, and 20 discs that are 10% certified. Delivering the network storage system 306 without being completely certified can save some factory throughput time for the manufacturer. The plurality of disc drives 320 may be finished upon delivery. Before the plurality of disc drives 320 is completely finished, a transient compression layer 322 may be established based on the finishedness of the plurality of disc drives 320. For example, discs 330 and 332 may be finished while discs 334 and 336 may be unfinished. The transient compression layer 322 may be established on discs 330 and 332 to store data while the rest of the plurality of disc drives 320 are being finished.

Data received from the network 302 may be compressed and encrypted then written to the transient compression layer 322 before the plurality of disc drives 320 is completely finished. After the plurality of disc drives 320 is finished and all of the discs (e.g., discs 330, 332, 334, and 336) are available to store data, the transient compression layer 322 may be destaged and written to the plurality of disc drives 320 using a normal capacity model. The destaging process is described with respect to FIG. 2, FIG. 5, and FIG. 6.

Communication between one or more arrays of discs (e.g., the plurality of disc drives 320), computer network 302, and external data source(s) and/or destinations may occur using a variety of communication protocols (e.g., transmission control protocol/internet protocol ("TCP/IP"), packet over synchronous optical network/synchronous digital hierarchy ("SONET/SDH"), multiprotocol label switching ("MPLS"), asynchronous transfer mode ("ATM"), Ethernet, and frame relay). As a result, data may be accessed and moved between individual discs of the array of discs and external data source(s) and/or destinations as desired.

In some implementations, each element of a storage system (e.g., a head/surface, a device, a set of devices, a subset of drives, etc.) may be treated as a separate finishing domain. Finishing occurs exclusively in a domain until it completes (e.g., the domain is dedicated for finishing). This implementation constrains and bounds certain parameters having to do with finishing thresholds. For a storage system, a domain can be an entire device or set of devices, which can conduct uninterrupted finishing process while the transient compression layer, located on separate device(s), caches the compressed data which will be destaged to different domain/devices.

Figure 4:
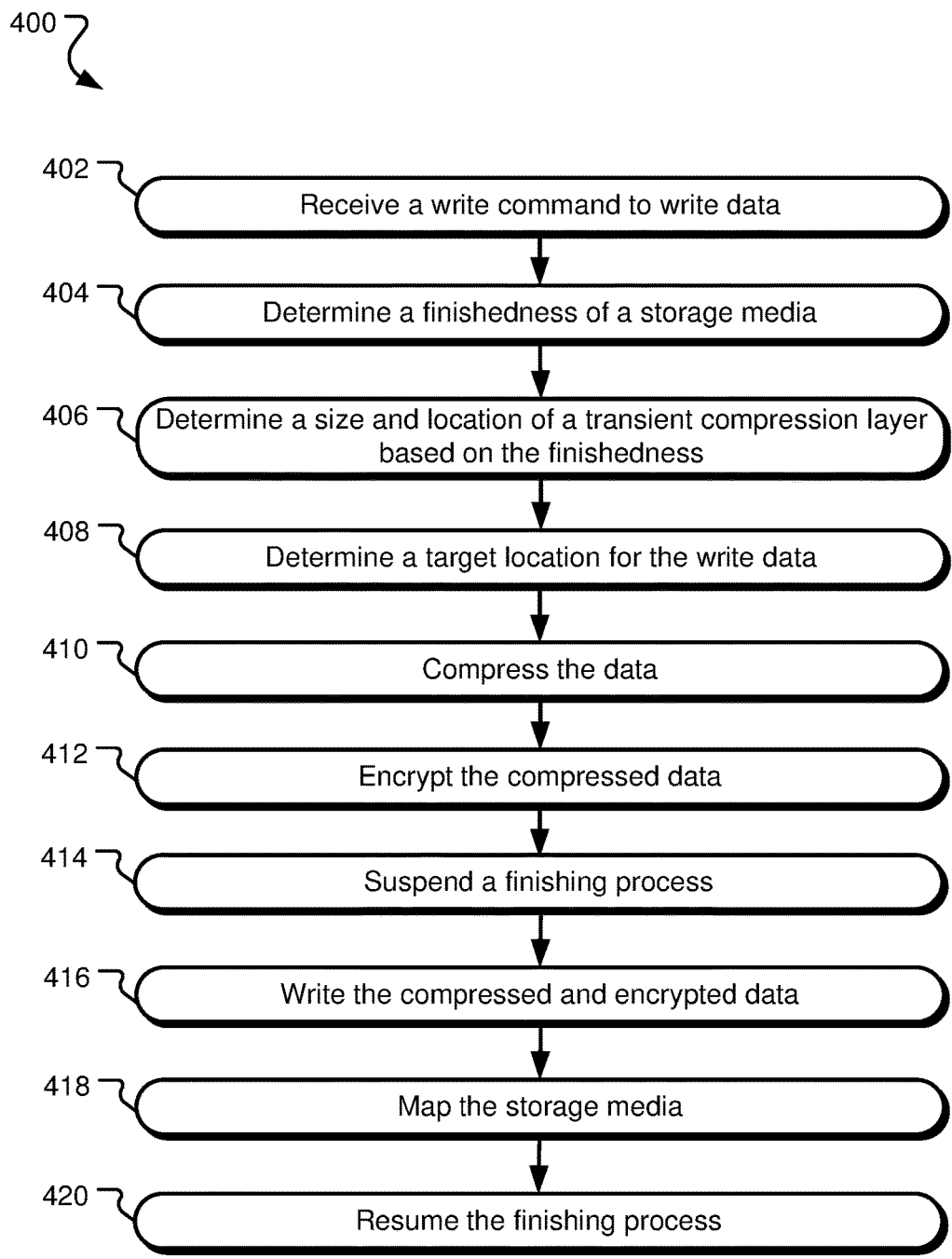
FIG. 4 illustrates example operations for storing data using a transient compression layer.

FIG. 4 illustrates example operations 400 for storing data using a transient compression layer. The operations 400 may be performed and/or controlled by a storage controller executing processor readable instructions encoded in a processor readable storage media. A receiving operation 402 receives a write command to write data. The write command may be received from a host computer or a network. The write command may be a batch of commands in a session. A determining operation 404 determines a finishedness of the capacity of the storage media. For example, the storage controller may request a finishedness of the capacity or the storage controller may already have the finishedness stored locally. A second determining operation 406 determines a size and location of a transient compression layer based on the determined finishedness. The transient compression layer may be established in a finished portion of the hard disc media or in a separate storage media of the storage device or storage system (e.g., in DRAM, SSD, or other volatile or non-volatile media). The determining operations 404 and 406 may not occur in response to a write request. For example, the determining operations 404 and 406 may occur when the transient compression layer system is initialized (e.g., at disc startup or after a threshold level of finishedness is complete). In this example, the size and location of the transient compression layer may be known by the storage controller.

A third determining operation 408 determines a target location of the write data. The storage controller may store the target location so that the write data may be retrieved when the write data is requested by a host device. The target location may also be used during a destaging process. The target location may be a Microsoft™ SQL server location. A compressing operation 410 compresses the data. The compressing operation 410 may be achieved by a compression unit executing processor readable instructions encoded in a processor readable storage media. A method of compression may be determined based on an available storage area, a size and type of data, an available space in the storage media or the transient compression layer, the finishedness of the capacity, and/or latency requirements. An optional encrypting operation 412 encrypts the data. The encrypting operation 412 may be achieved by an encryption unit executing processor readable instructions encoded in a processor readable storage media. An optional suspending operation 414 suspends a finishing process of the hard disc media. In some implementations the suspending operation 414 is not necessary because a transient compression layer may be established in a storage media outside the main store (e.g., a SSD or DRAM). The finishing process may be ongoing while the storage device or storage system is in a down time. A writing operation 416 writes the compressed and encrypted data to the transient compression layer. The data may pass through a buffer before being written to the transient compression layer. The storage device may return status to the host that the write has been completed for the write request of the batch of work. A mapping operation 418 maps the location of the data in the transient compression layer to an address retrievable by the storage controller.

An optional resume operation 420 resumes the finishing process. Because the finishing process may use resources (e.g., read and write head) of the hard disc media of the storage device, the storage device or storage system may not be able to read from or write to the hard disc media while the finishing process is ongoing. As stated above, the finishing process may not be interrupted if the transient compression layer is established in a storage media outside the main store (e.g., the hard disc media) of the storage device. The operations 400 may repeat until the finishing process is complete. Once the finishing process is complete or the capacity is determined to be finished above a pre-determined level of finishedness, the transient compression layer may be destaged and the data may be written to the main store (e.g., the hard disc media) using a normal capacity model. In alternative implementations, the destaging process may begin when the transient compression layer is filled with compressed data above threshold capacity.

Figure 5:
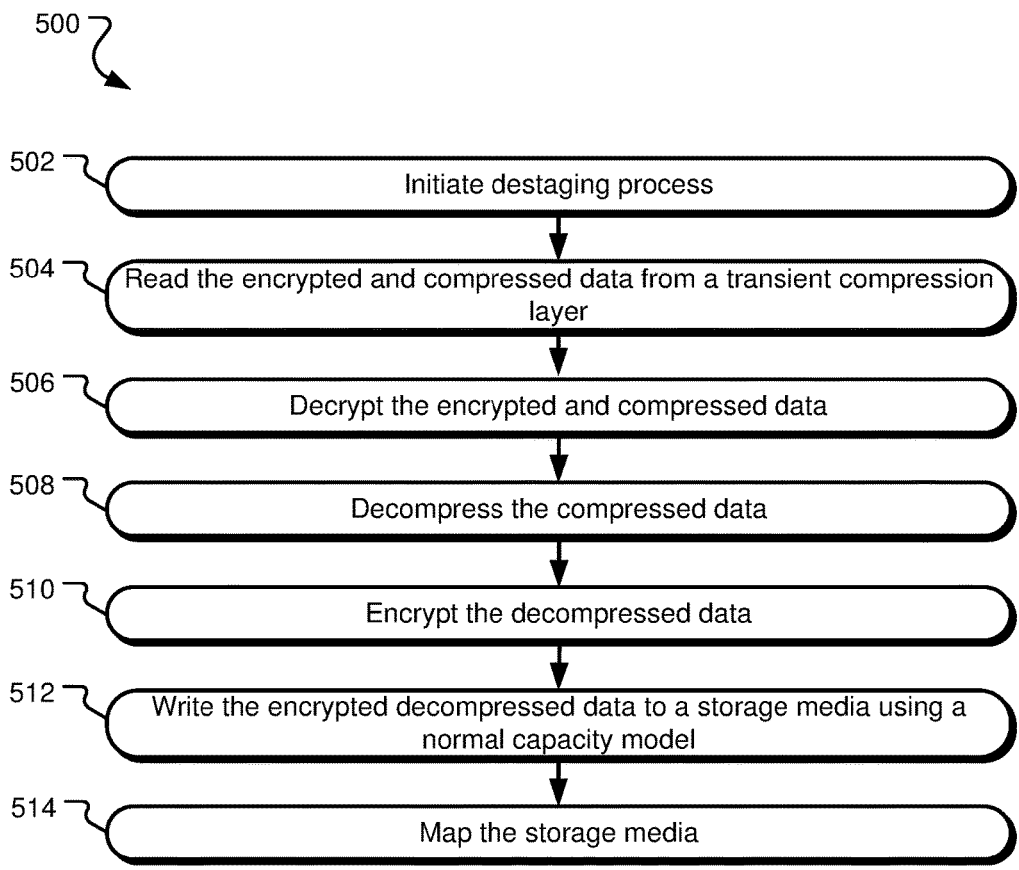
FIG. 5 illustrates example operations for destaging data from a transient compression layer.

FIG. 5 illustrates example operations 500 for destaging data from a transient compression layer. The operations 500 may be performed and/or controlled by a storage controller executing processor readable instructions encoded in a processor readable storage media. An initiating operation 502 initiates the destaging process based upon an evaluation of the resources of the system and the ability of the system to accomplish work in addition to host/client activity. The initiating operation 502 may be commenced in response to a completion of the finishing process of the hard disc media, determining that the hard disc media is finished above a predetermined threshold of finishedness, or determining that the transient compression layer is filled above a predetermined capacity threshold. A reading operation 504 reads encrypted and compressed data from the transient compression layer. A decrypting operation 506 decrypts the encrypted and compressed data. The decrypting operation 506 may be achieved by an encryption unit of the storage device or storage system. A decompressing operation 508 decompresses the compressed data. The decompression operation 508 may be achieved by a decompression unit. An optional encrypting operation 510 encrypts the decompressed data. The encrypting operation 510 may be achieved by the encryption unit. A writing operation 512 writes the encrypted decompressed data to the main store using a normal capacity model. The data may be buffered before being transferred to the main store. A mapping operation 514 maps the main store to LBAs accessible by a host computer.

Figure 6:
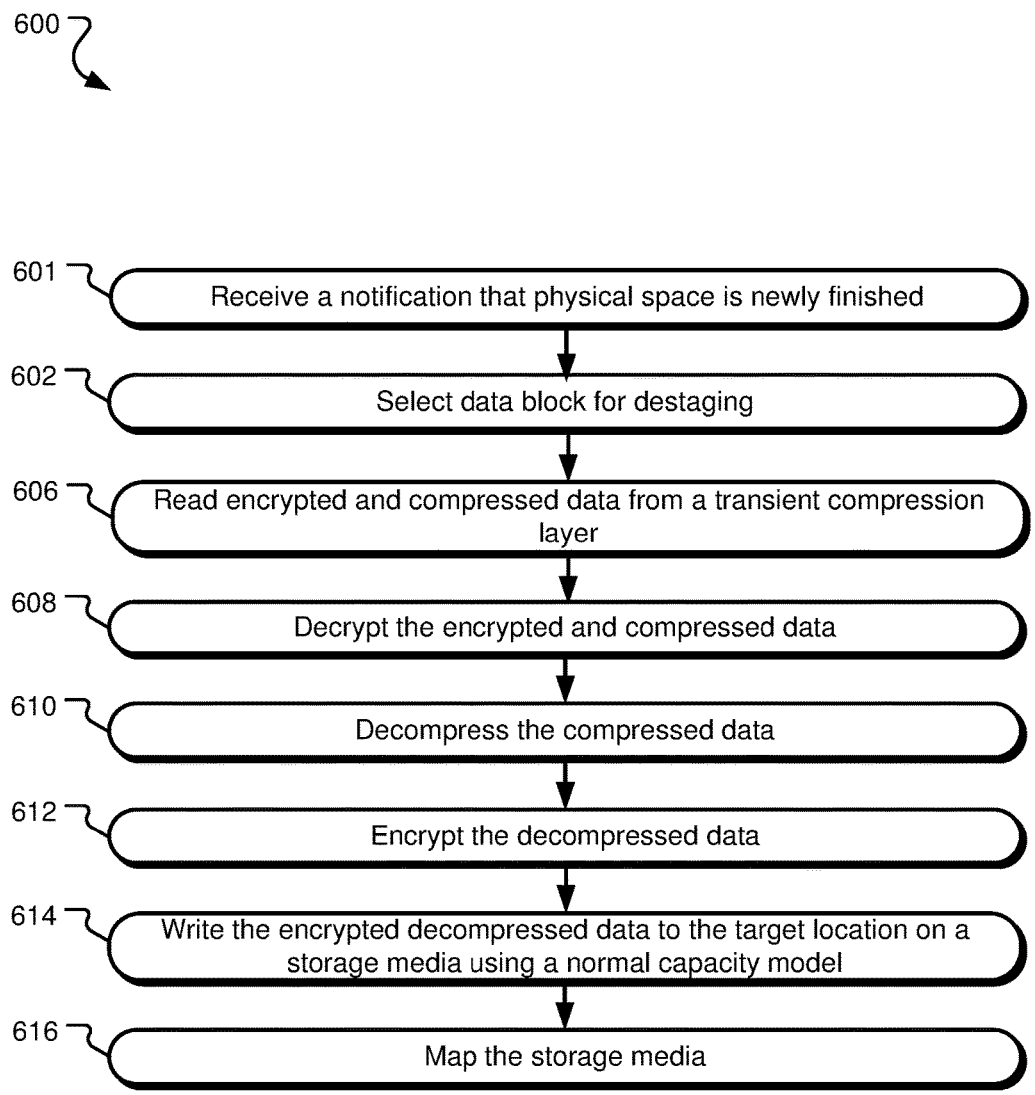
FIG. 6 illustrates alternative example operations for destaging data from a transient compression layer.

FIG. 6 illustrates alternative example operations 600 for destaging data from a transient compression layer. Specifically, FIG. 6 illustrates example operations for destaging the transient compression layer before the main store is completely finished. The operations 600 may be performed when the transient compression layer satisfies a capacity threshold. For example, the threshold may be defined as 75% of the transient compression layer. Once the transient compression layer is at 75%, portions of it may be destaged to make free up space in the transient compression layer. Additionally or alternatively, destaging may begin once the main store is finished above a certain threshold. For example, if the storage area is 75% finished, then the destaging process may begin. The operations 600 may be performed and/or controlled by a storage controller executing processor readable instructions encoded in a processor readable storage media.

A receiving operation 601 receives a notification that physical space is newly finished. The receiving operation 601 may occur responsive to a portion of the main store or capacity being finished. For example, every time 1 GB of the physical space is finished, the storage controller may be notified that data may be destaged from the transient compression layer. It should be understood that other sizes of physical space or other conditions may be satisfied to prompt the receiving operation 601. A selecting operation 602 selects a data block for destaging. The data block may be selected, based on a sequential process, based on its size (e.g., to free up a certain capacity in the transient compression layer) or based on its original target write location within the main store relative to recent finishing operations. It should be understood that blocks may be selected based on other factors. A reading operation 606 reads encrypted and compressed data from a transient compression layer. For example, the storage controller may know that the target location of certain data may be finished. Thus, the storage controller may destage that data from the transient compression layer and write it to its original target location. In some implementations, any data in the transient compression layer can be written to any physical location on the disc that is finished. For example, a logical region that takes up most resources in the transient compression layer may be selected and moved to the finished portion of the magnetic media. Other methods for selecting the data to be destaged may be employed. A decrypting operation 608 decrypts the encrypted and compressed data. A decompressing operation 610 decompresses the compressed data. An encrypt operation 612 encrypts the decompressed data. A writing operation 614 writes the encrypted decompressed data to the target location on the main store using a normal capacity model. A mapping operation 616 maps the main store to LBAs accessible by the host computer.

Figure 7:
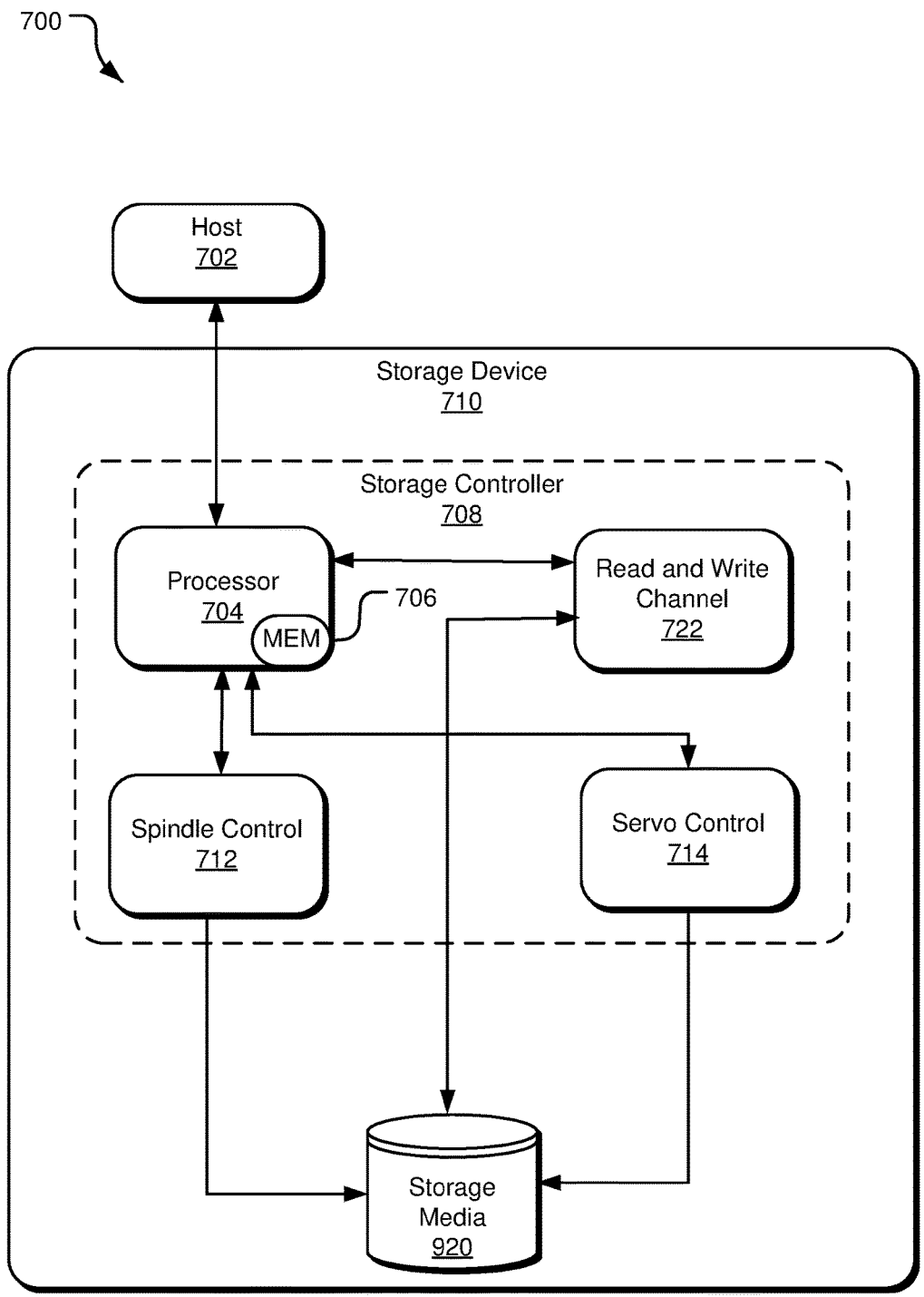
FIG. 7 illustrates an example schematic of a storage controller of a storage device.

FIG. 7 illustrates an example schematic 700 of a storage controller 708 of a storage device 710. Specifically, FIG. 7 shows one or more functional circuits that are resident on a printed circuit board used to control the operation of the storage device. The storage controller 708 is operably and communicatively connected to a host computer 702. Control communication paths are provided between the host computer 702 and a processor 704. Control communication paths are provided between the processor 704 and the storage media 720 via a number of read/write channels (e.g., read and write channel 722). The processor 704 generally provides top-level communication and control for the controller 708 in conjunction with processor readable instructions for the processor 704 encoded in processor readable storage media 706. The processor readable instructions comprise instructions for controlling writing to and reading from data sectors on a storage media 720. The processor readable instructions further include instructions for establishing a transient compression layer based on a level of finishedness of the storage media 720 and for reading to and writing from the transient compression layer. The processor readable instructions further include instructions for compression, encrypting, decompressing, and decrypting data and destaging the transient compression layer.

The term "processor readable storage media" includes but is not limited to, random access memory ("RAM"), ROM, EEPROM, flash memory or other memory technology, CDROM, digital versatile discs (DVD) or other optical disc storage, magnetic cassettes, magnetic tape, magnetic disc storage or other magnetic storage devices, or any other tangible medium which can be used to store the desired information and which can be accessed by a processor. In contrast to tangible processor-readable storage media, intangible processor-readable communication signals may embody processor readable instructions, data structures, program modules or other data resident in a modulated data signal, such as a carrier wave or other signal transport mechanism. Note that while, the system for management of system files on a storage device is disclosed herein in context of an HDD, one or more aspects the technology disclosed herein may also be applicable to other storage devices enumerated above.

The storage controller 708 controls storage of data on the storage media 720 such as magnetic disc, optical discs, etc. A spindle motor control circuit 712 controls the rotation of storage media 720. A servo circuit 714 provides control for moving an actuator that moves heads (not shown) between tracks on the storage media 720 and controls the position of the head.

Other configurations of storage controller 708 are contemplated. For example, storage controller 708 may include one or more of an interface circuitry, a buffer, a disc drive, associated device peripheral hardware, an encryption unit, a compression unit etc. The processor readable instructions may be included on the host computer or somewhere else on a storage system.

In addition to methods, the embodiments of the technology described herein can be implemented as logical steps in one or more computer systems. The logical operations of the present technology can be implemented (1) as a sequence of processor-implemented steps executing in one or more computer systems and/or (2) as interconnected machine or circuit modules within one or more computer systems. Implementation is a matter of choice, dependent on the performance requirements of the computer system implementing the technology. Accordingly, the logical operations of the technology described herein are referred to variously as operations, steps, objects, or modules. Furthermore, it should be understood that logical operations may be performed in any order, unless explicitly claimed otherwise or unless a specific order is inherently necessitated by the claim language.

Data storage and/or memory may be embodied by various types of storage, such as hard disc media, a storage array containing multiple storage devices, optical media, solid-state drive technology, ROM, RAM, and other technology. The operations may be implemented in firmware, software, hard-wired circuitry, gate array technology and other technologies, whether executed or assisted by a microprocessor, a microprocessor core, a microcontroller, special purpose circuitry, or other processing technologies. It should be understood that a write controller, a storage controller, data write circuitry, data read and recovery circuitry, a sorting module, and other functional modules of a data storage system may include or work in concert with a processor for processing processor-readable instructions for performing a system-implemented process.

For purposes of this description and meaning of the claims, the term "memory" means a tangible data storage device, including non-volatile memories (such as flash memory and the like) and volatile memories (such as dynamic random access memory and the like). The computer instructions either permanently or temporarily reside in the memory, along with other information such as data, virtual mappings, operating systems, applications, and the like that are accessed by a computer processor to perform the desired functionality. The term "memory" expressly does not include a transitory medium such as a carrier signal, but the computer instructions can be transferred to the memory wirelessly.

The above specification, examples, and data provide a complete description of the structure and use of example embodiments of the disclosed technology. Since many embodiments of the disclosed technology can be made without departing from the spirit and scope of the disclosed technology, the disclosed technology resides in the claims hereinafter appended. Furthermore, structural features of the different embodiments may be combined in yet another embodiment without departing from the recited claims.

What is claimed is:

1. A method comprising:
   receiving a request to write data to a capacity of a storage device from a host device, the capacity being presented to the host device via range of logical block addresses (LBAs), the storage device including one or more storage media for storing the data directed to the capacity;
   compressing the data; and
   writing the compressed data to a transient compression layer allocated to the one or more storage media, the transient compression layer configured to store the data in a compressed state and directed to the capacity until an uncertified portion of the one or more storage media is certified by the storage device to store the data.

2. The method of claim 1 wherein at least a portion the capacity is allocated to one or more hard disc media, the transient compression layer being allocated to a certified portion of the one or more hard disc media.

3. The method of claim 1 wherein at least a portion of the capacity is allocated to a SSD and a hard disc media of the storage device, the transient compression layer being allocated to the SSD.

4. The method of claim 1 further comprising:
   destaging the transient compression layer when the capacity is certified above a predetermined threshold of certification.

5. The method of claim 4 wherein destaging the transient compression layer comprises:
   reading compressed data from the transient compression layer;
   decompressing the compressed data; and
   writing the decompressed data to the capacity.

6. The method of claim 1 wherein data written to the capacity is persisted to the transient compression layer in a compressed state, the compressed data being utilized as a mirror for the capacity.

7. The method of claim 1 wherein the capacity is allocated to a plurality of storage devices, a subset of the plurality of storage device being dedicated for certification, the transient compression layer being allocated to one or more storage media outside the subset of the plurality of disc drives dedicated for certification.

8. A storage system comprising:
   a capacity allocated to one or more storage media, the capacity being presented to a host device via range of logical block addresses (LBAs); and
   a storage controller configured to:
      receive a request to write data to the capacity from the host device, and
      write the data in a compressed state to a transient compression layer allocated to the one or more storage media, the transient compression layer configured to store the data in a compressed state and directed to the capacity until an uncertified portion of the one or more storage media is certified by the storage device to store the data.

9. The storage system of claim 8 wherein at least a portion the capacity is allocated to one or more hard disc media, the transient compression layer being allocated to a certified portion of the one or more hard disc media.

10. The storage system of claim 9 wherein at least a portion of the capacity is allocated to a SSD and a hard disc media, the transient compression layer being allocated to the SSD.

11. The storage system of claim 9 wherein the storage controller is further configured to destage the transient compression layer when the capacity is certified above a predetermined threshold of certification.

12. The storage system of claim 9 wherein data written to the capacity is persisted to the transient compression layer in a compressed state, the compressed data being utilized as a mirror for the capacity.

13. The storage system of claim 9 wherein the capacity is allocated to a plurality of storage devices, a subset of the plurality of disc drives being dedicated for certification, the transient compression layer being allocated to one or more storage media outside the subset of the plurality of disc drives dedicated for certification.

14. One or more non-transitory processor-readable storage media encoding computer-executable instructions for executing on a computer system a computer process, the computer process comprising:
   receiving a request to write data to a capacity of a storage device from a host device, the capacity being presented to the host device via range of logical block addresses (LBAs), the storage device including one or more storage media for storing the data directed to the capacity;
   compressing the data; and
   writing the compressed data to a transient compression layer allocated to the one or more storage media, the transient compression layer configured to store the data in a compressed state and directed to the capacity until an uncertified portion of the one or more storage media is certified by the storage device to store the data.

15. The one or more non-transitory processor-readable storage media of claim 14 wherein at least a portion the capacity is allocated to one or more hard disc media, the transient compression layer being allocated to a certified portion of the one or more hard disc media.

16. The one or more non-transitory processor-readable storage media of claim 15 wherein at least a portion of the capacity is allocated to a SSD and a hard disc media of the storage device, the transient compression layer being allocated to the SSD.

17. The one or more non-transitory processor-readable storage media of claim 15 further comprising
   destaging the transient compression layer when the capacity is certified above a predetermined threshold of certification.

18. The one or more non-transitory processor-readable storage media of claim 17 wherein destaging the transient compression layer comprises:
   reading compressed data from the transient compression layer;
   decompressing the compressed data; and
   writing the decompressed data to the capacity.

19. The one or more non-transitory processor-readable storage media of claim 15 wherein data written to the capacity is persisted to the transient compression layer in a compressed state, the compressed data being utilized as a mirror for the capacity.

20. The one or more non-transitory processor-readable storage media of claim 15 wherein the capacity includes a plurality of disc drives, a subset of the plurality of disc drives being dedicated for certification, the transient compression layer being allocated to one or more storage media outside the subset of the plurality of disc drives dedicated for certification.

* * * * *